Feb. 5, 1963
C. R. WOODBURY, JR
3,076,574
BABY FOOD FEEDER
Filed Nov. 18, 1959
2 Sheets-Sheet 1
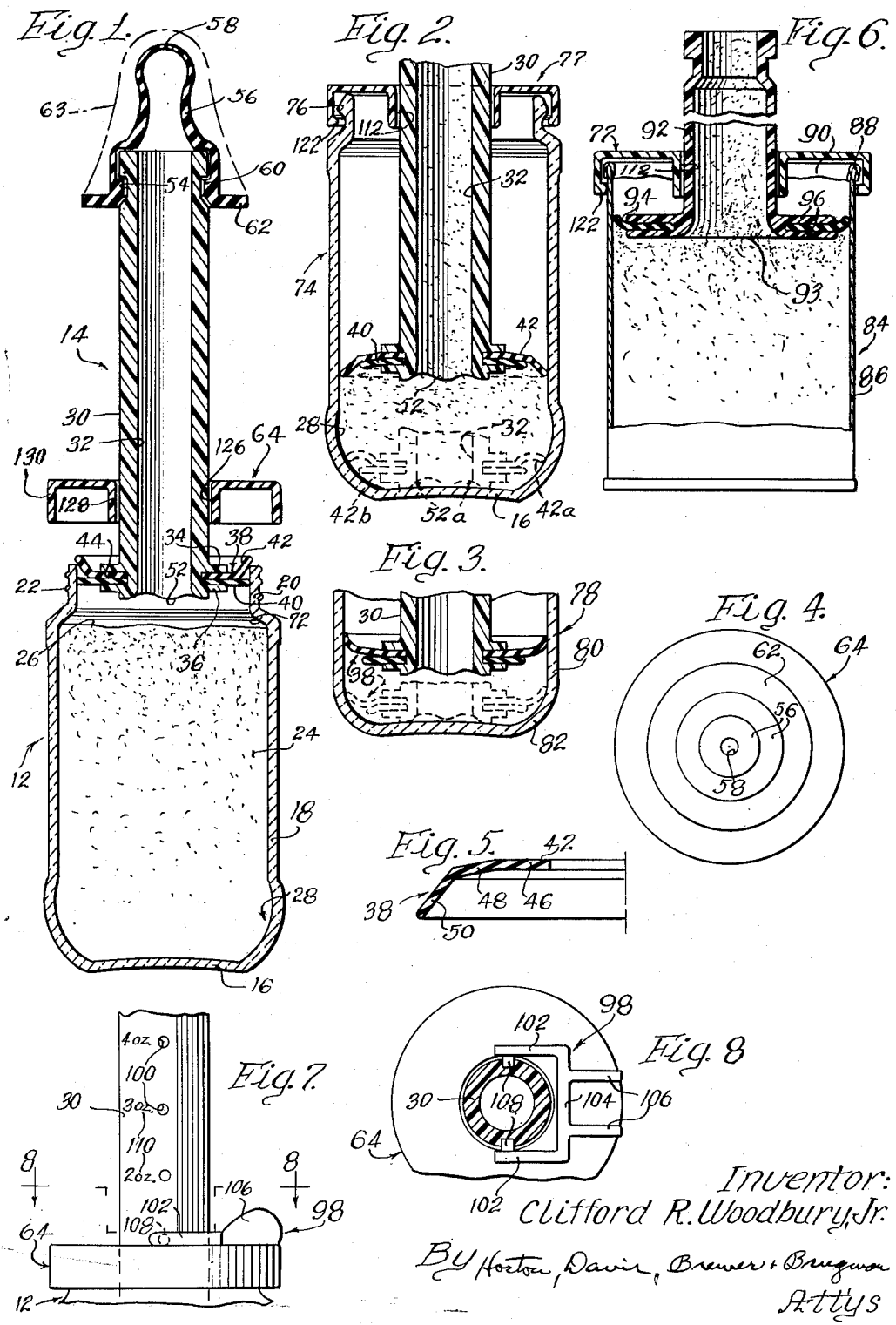
Inventor:
Clifford R. Woodbury, Jr.
BY Horton, Davis, Brewer + Bregman
Attys Feb. 5, 1963  C. R. WOODBURY, JR  3,076,574
BABY FOOD FEEDER
Filed Nov. 18, 1959
2 Sheets-Sheet 2
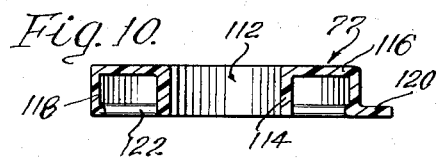
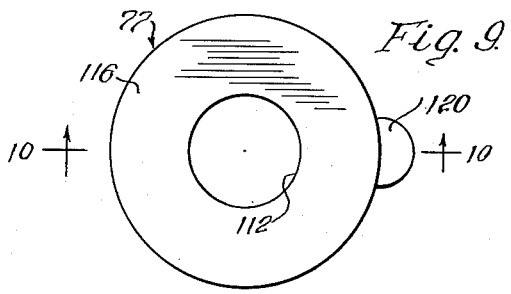
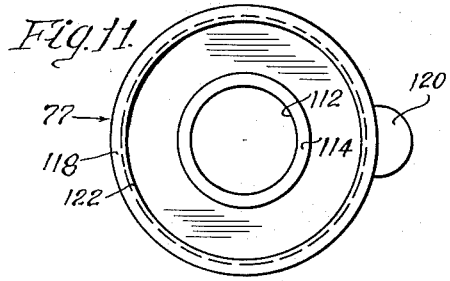
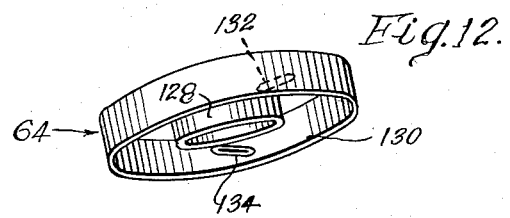
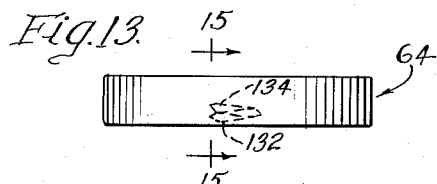
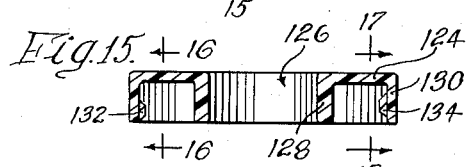
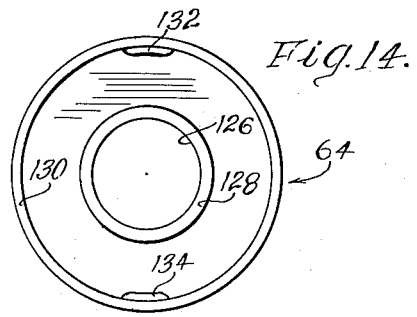
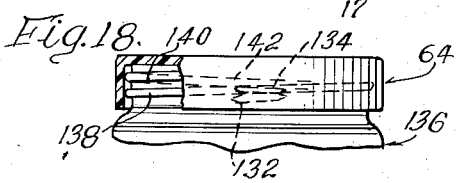
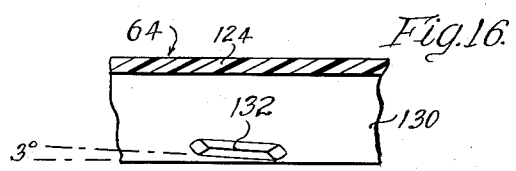
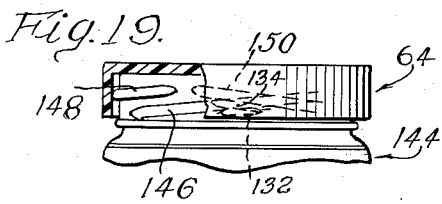
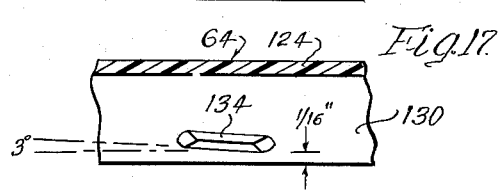
Inventor:
Clifford R. Woodbury, Jr.
BY Horton, Davis, Brewer & Bergman
Attys United States Patent Office 3,076,574
Patented Feb. 5, 1963

3,076,574
BABY FOOD FEEDER
Clifford R. Woodbury, Jr., 7747 N. Hermitage Ave.,
Chicago, Ill.
Filed Nov. 18, 1959, Ser. No. 853,920
9 Claims. (Cl. 215—11)

The present invention relates to baby food feeders, and more particularly to such a feeder for feeding semi-solid foods to babies.

A broad object of the invention is to provide a baby food feeder for feeding semi-solid foods to babies, which includes a nipple and involves a sucking action by the baby thus utilizing a natural instinct of the baby.

The semi-solid foods concerned include strained fruits, meats, and vegetables, and combinations thereof. Due to their being strained, they are capable of flowing action. They are usually put up and sold in jars with removable lids, or in cans, the covers of which may be removed by a can opener.

One of the most important objects of this invention is to provide a means whereby a transitional phase is set up during baby's development between the milk-nipple stage and the food-spoon stage which makes feeding strained foods in the early period of development easier because of the baby's familiarity with a nipple, and which makes subsequent spoon training faster and easier, because when a spoon is first presented with food in it, the baby will already be familiar with the food. Consequently, crossing the "spoon barrier" becomes a simple matter.

A more specific object of the invention is to provide a device of the general nature referred to above, that is readily adaptable to conventional containers, such as the jars or cans referred to, and in conjunction with such a container forming a complete device effective for feeding the food to a baby by utilizing the natural sucking action of the baby whereby the food is drawn into the baby's mouth under the influence of atmospheric pressure, without the baby's drawing in any air in the process, an important consideration in avoiding colic, which comes from swollowing air.

A further object is to provide a baby food feeder of the character mentioned that can be easily and readily adapted to conventional containers as sold to the public, and upon removal of the top of the container and application of the feeder to the container, they form a unitary device for feeding semi-solid foods to baby, without the requirement of any extraneous instrumentalities.

An additional and more specific object is to provide a device of the foregoing character which may be kept in sterile and sealed condition until use, when it may be used with an original container of food, which, in the condition in which it is sold, is closed and sealed, and is not opened until it is intended to feed the baby, with attendant advantages such as sanitation and ease in feeding a baby in travel.

Other objects include general cleanliness and absence of messiness, and no waste of food due to inability to thoroughly remove the food from the container by use of a spoon or other conventional means.

Another object is to provide, in conjunction with a baby food feeder of the foregoing general character, a cap for fitting on the food container, which in one form can be easily snapped onto and off of a non-threaded type of container, and which in another form is equally adaptable to screw-threaded containers of the continuous thread, or interrupted thread type, and which has the further advantage of high effectiveness in guiding the feeder proper in its movements relative to the container.

Other objects and advantages of the invention will appear from the following detail description taken in conjunction with the accompanying drawings in which:

FIGURE 1 is a longitudinal sectional view of the baby food feeder of the present invention in conjunction with a jar of baby food;

FIGURE 2 is a view similar to FIGURE 1, but showing the feeder in a different position relative to the jar;

FIGURE 3 is a fragmentary view similar to FIGURES 1 and 2 showing the feeder in conjunction with a jar of slightly different shape;

FIGURE 4 is a plan view of the device of FIGURE 1;

FIGURE 5 is a large scale sectional view of a portion of a sealing washer used with the feeder of FIGURES 1–3;

FIGURE 6 is a longitudinal sectional view of a baby food feeder of a type adapted for use with cans of baby food, shown in conjunction with such a can;

FIGURE 7 is a view of a portion of the baby food feeder in elevation and a portion of a jar, illustrating a detachable limiting device for limiting the amount of food that can be withdrawn from the jar in the feeding action;

FIGURE 8 is a view taken on line 8—8 of FIGURE 7;

FIGURE 9 is a plan view of a snap-on type of cap for use in connection with the feeder proper;

FIGURE 10 is a sectional view taken on line 10—10 of FIGURE 9;

FIGURE 11 is a bottom view of the cap of FIGURES 9 and 10;

FIGURE 12 is a perspective view of a second form of cap, adaptable to either a continuous thread or interrupted thread type of baby food container;

FIGURE 13 is a side elevational view of the cap of FIGURE 12;

FIGURE 14 is a bottom view of the cap of FIGURES 12 and 13;

FIGURE 15 is a sectional view taken substantially on line 15—15 of FIGURE 13;

FIGURE 16 is a large scale detail view taken at line 16—16 of FIGURE 15;

FIGURE 17 is a large scale detail view taken at line 17—17 of FIGURE 15;

FIGURE 18 is a view of the present form of cap oriented according to FIGURE 15 but applied to a baby food jar of the continuous thread type; and FIGURE 19 is a view similar to FIGURE 18 but showing the cap applied to a baby food jar of the interrupted thread type.

Referring now to the specific forms of the invention illustrated in the accompanying drawings, the baby food feeder of the present invention is especially adapted to use with conventional containers of baby food that are at present on the market. The baby foods of the kind here concerned are in a semi-solid state and are of relatively flowing condition, whereby it is possible to utilize a nipple, and the natural instinct of a baby to suck, for feeding the baby, while avoiding the possibility of colic by sealing out the air from the food. These strained semi-solid foods of the kinds referred to above include solid particles of minute size and a quantity of liquid to facilitate the flowing action.

FIGURE 1 illustrates a device made according to the present invention in conjunction with one type of food container. In this instance the food container illustrated at 12 is in the form of a cylindrical jar, while the baby food feeder to be used in conjunction therewith is shown as a whole at 14. The jar 12 is of a kind that is now well known and includes a bottom element 16, a surrounding wall 18, and a constricted neck portion 20. The jar 12 may be of glass or other desired material, and the neck portion 20 in this instance is provided with external threads 22 for detachably securing a lid on the jar in the original manufacture thereof. The jar is filled with food, indicated at 24, such as one of the above-mentioned foods, to a convenient level such as that indicated at 26 or adjacent the constricted neck portion 20.

The neck portion 20 is so constructed that the sealing lid, when applied thereto by the food processor and packer, may be substantially flush with the main wall portion 18, or at least will not project radially therebeyond, for facility in packing the jars in a case and stacking on a shelf. The kind of jar 12 shown in FIGURE 1 includes a bulbous portion 28 which may be provided for design purposes.

The baby feeder 14 shown in FIGURE 1 and constituting one embodiment of the invention, includes a main tubular stem 30 having a bore 32 through which the food passes during the feeding action. This stem 30 is preferably transparent for aesthetic purposes, although, of course, it need not be transparent for functional purposes. I have found that any of various plastic materials may be utilized for construction of the stem, such materials lending themselves to easy and economical molding operations. The dimensions of the stem 30 may be as desired within a relatively wide range, and as an example of a practical device made according to the invention, the stem 30 may be approximately 13/16 inch in outer diameter and ½ inch in inner diameter. It will be understood, however, that these dimensions are merely exemplary and not limiting.

The stem 30 at its lower end is provided with axially spaced external radial flanges 34 and 36 utilized for detachably mounting sealing means indicated generally at 38 and taking the form of washers. The sealing means in the present instance preferably includes two separate washers, 40 and 42, which are fitted in the space 44 between the flanges 34 and 36. These sealing washers are of highly flexible and resilient material and may be of natural rubber or other suitable material. The thickness of the washers is such that they substantially fill the space 44. The washer 40 has an outer diameter substantially equivalent to, or slightly larger than, the inner diameter of the surrounding neck wall 20. The washer 40 is preferably flat, while the larger washer 42 is preformed to a predetermined shape, a section of which is shown in FIGURE 5. It includes a main central portion 46 which is substantially planar in shape, outwardly of which is another portion 48 inclined at a small angle to the portion 46 such as, for example, in the neighborhood of ten degrees, and finally an outer peripheral portion 50 disposed at a larger angle such as in the neighborhood of fifty-five degrees to the inner planar portion 46. The inner portion 46 of the washer is dimensioned so as to be disposed principally in the space 44, while the portion 48 is disposed just beyond the flange 34 and the outer peripheral portion 50 is positioned for engaging the inner surface of the jar, in a manner to be described more fully herein below.

The lower extremity of the cylindrical portion of the stem 30, indicated at 52, is serrated or of undulating shape so that upon engagement with the bottom element of the jar, which it does engage as shown in FIGURES 2 and 3, there remains a passage between the bore 32 of the stem and the space surrounding the stem under the sealing means. This feature will again be referred to herein below.

The stem 30 is provided with a circumferential groove 54 in its outer surface in close proximity to the end of the stem opposite the sealing means 38. For convenience in reference, the device may be considered oriented according to the position illustrated in FIGURE 1 wherein the lower end of the stem 30 may be considered the inner end, being inserted into the jar 12, and the opposite or upper end may be considered the outer end. The terms "inner end" and "outer end" are preferable, because in actual use the jar and feeder, as a unit, will assume different positions from that illustrated in FIGURE 1, and most often various inverted positions, as referred to herein below.

Removably mounted on the outer end of the stem is a nipple 56 of a kind generally similar to that used in conjunction with feeding milk to babies, except that the nipple has an aperture 58 of relatively great size, in order to facilitate the flow of the semi-solid foods therethrough, which may be on the order of ⅛ to 3/16 inch in diameter. The base portion of the nipple includes an interior circumferential bead 60 which snaps into the groove 54, and the nipple also may include an exterior radial flange 62 for gripping by the fingers to facilitate its placement on the stem and removal therefrom. The stem 30 outwardly from the flanges 34 and 36 is of uniform outer diameter, except for the groove 54. If desired, a nipple cover 63 of known kind may be used for covering the nipple when the feeder is not in use.

Preferably, the stem is provided with a cap 64 which serves to generally close the jar above the sealing means 38 and to act as a guide for the movement of the stem. In accordance with the principles of the invention, the caps used with the containers of food assume two different forms, of which the cap 64 is one, and which are disclosed in detail in FIGURES 9–19 and described fully herein below. The cap 77 is used in conjunction with "snap-on cover" type jars, while the cap 64 is used in conjunction with "twist-on" and "screw-on" type jars. The cap 64 has a central aperture 126 for receiving the stem 30, which is dimensioned for easy sliding movement of the stem, but also for guiding the stem and confining it to a centrally aligned position. The cap has a peripheral downwardly extending flange 130 which fits over the threaded neck portion of the jar, as explained fully herein below, and an inner flange 128 defining the aperture 66.

In the use of the baby food feeder, when it is desired to feed the baby, a jar 12 (of 74) of the desired food is selected and the original lid provided thereon removed and, in many cases, immediately discarded. Then the baby food feeder 14 is applied to the jar without in any other way conditioning the jar or the food therein, except, if desired, to warm the food in the jar either before or after applying the feeder to the jar. The baby food feeder is applied in a series of steps indicated in FIGURES 1 and 2. The nipple 56 may have been previously applied to the stem, as was the cap 64 which may slide thereon between the limits of the flange 34 and the nipple. The inner end of the stem is inserted into the jar, and in this step the lower or inner sealing washer 40 engages the inner surface of the neck portion 20.

The washer 40 makes a seal with the surface of the neck portion of the jar. Therefore, if the level of the food 26 should be higher than that indicated and extend into the neck portion, in response to moving the stem downwardly into the jar, the food will be forced into the bore 32 of the stem in preference to passage out of the jar past the washer 40. In this step the upper or outer washer 42 flexes to enable movement of it through the neck portion, and the smaller washer provides all sealing action that may be required in the neck portion. Upon the sealing means passing through the neck portion, the upper or outer washer 42 expands or flexes out to its full or very nearly full dimension into engagement with the inner surface of the main wall 18. This washer, in flexing to its larger effective diameter, closely follows the contour of the shoulder 72 of the inner surface of the jar and engages the inner surface of the main surrounding wall 18 itself, and any food that must be displaced due to insertion of the stem into the jar to the extent just described, is by way of movement into the bore 32 of the stem.

When the stem has been inserted into the jar to the extent just indicated, the cap 64 (or 77) may be fitted onto the neck portion of the jar and detachably held thereon, in the position indicated in FIGURE 2. The assembly of jar and baby food feeder applied thereon is then ready for use.

It is preferred that the baby not be permitted to draw in air in commencement of the feeding operation. Therefore, preparatory to placing the nipple 56 into the baby's mouth, the stem may be manually moved toward the bottom of the jar to force the food through the bore 32 and into the nipple, thus displacing the air inside the bore 32. Then the assembly of jar and feeder is ready for the feeding operation.

Pursuant to the sucking action of the baby, the food is drawn through the stem, which results in a partial vacuum, thus causing atmospheric pressure to be exerted on the feeder above the sealing means, forcing the assembly further into the jar in constant contact with the level of the food in the jar. Air is permitted to enter the jar through the central aperture 126 (or 112) in the cap around the stem and between the jar and cap around the periphery.

It will be understood that in the feeding operation the baby food feeder will most often be in a position inverted from that shown. However, whatever the position assumed, the feeding operation is not affected, or at least not materially. When the nipple end is downward, for example, the jar moves down relative to the stem in telescoping relation thereto. Also, if it is lying horizontal, the same action occurs, and when the baby is being feed while sitting upright in a chair, or while being held, the nipple end normally will be uppermost and the jar lowermost, and the jar will move relative to the stem under the influence of atmospheric pressure in exactly the same manner. This feature whereby the assembly may assume any of those positions is made possible by the present invention, and in this respect differs entirely from a milk feeding operation. In the case of a milk bottle it is necessary for the nipple to be in a lowered position and for air to enter into the bottle to enable the milk to flow out.

This baby feeder constitutes the transition between nipple-milk feeding and spoon-food feeding, with the advantageous result that the baby accepts semi-solid food more readily through a nipple, and then when the baby reaches several months of age, he will more readily be able to be fed by spoon because he will have already become accustomed to food, as distinguished from milk. Thus, the training phase in this respect will have been eliminated.

The washer 42 is enabled to expand or flatten out sufficiently to engage the bulbous portion 28 as it approaches the bottom of the jar and thus, notwithstanding the non-uniformity of the inner diameter of the jar, good sealing action is effected down to the lowermost position of the stem. As the stem approaches the bottom element 16, the diameter of the bulbous portion 28 diminishes to less than that of the wall member 18 and the peripheral portion of the sealing washer bends sharply upward near the circumference of flange 34 and downward at the outside circumference of the sealing washer 42 as indicated at 42a, and it continues in that condition to a point closely proximate the bottom element 16.

Also, as illstrated in FIGURE 2, the serrated end 52 of the stem, upon engaging the bottom element 16, provides openings 52a which enable passage of the last remnants of food in the space 42b below the sealing means into the bore 32 of the stem. Thus, substantially all of the food in the jar can be drawn through the stem with virtually no waste. In the final stages of the feeding operation, the sealing washer 42, under the influence of atmospheric pressure and constricted wall of the jar, buckles, thus breaking the seal between itself and the wall of the jar and allowing for passage of air, enabling that part of the food that is then in the stem 30 to be drawn out in the continued feeding operation.

The sealing washers 40 and 42 are of such high elasticity that they can be stretched over either flange and fitted into the space 44. Although the washer 42 is preferably disposed with its concave side inwardly, or downwardly as indicated in FIGURE 2, the invention is not limited to this condition, since it will function satisfactorily in the opposite position with its concave portion facing outwardly, or upwardly, when used in conjunction with jars of small inside diameter than that shown in FIGURE 2.

The jars used for baby food that are now on the market are of several different well known kinds and sizes. Those of FIGURES 1 and 2, as referred to above, are similar to each other, with slightly different kinds of neck portions. The jar 78 fragmentarily illustrated in FIGURE 3 is of another kind and, specifically, is slightly smaller in diameter than those of FIGURES 1 and 2. Therefore, in the case of the slightly smaller jar of FIGURE 3, it may be preferred to reverse the position of the sealing washer 42 so that its concave side faces outwardly, or upwardly. When used in this position, the sealing washer more effectively seals against the inner surface of the surrounding wall member 80, i.e., since the sealing washer must be contracted slightly it will contract more easily in the position in which the inclined peripheral portion thereof is in trailing position rather than in leading position with respect to the movement of the stem into the jar. The jar 78, in addition to being of slightly lesser diameter than the previous jars mentioned, also is without the bulbous portion 28 of FIGURE 1, i.e., the surrounding wall member 80 is substantially uniform down to a point near the bottom where it directly converges, as indicated at 82, into the bottom element. In this case the sealing washer 42 conforms readily to the curved shape.

While most baby food is put out in jars of the kinds described above, it is also put out in cans of the kind illustrated generally in FIGURE 6. In this case the can 84 is of the usual construction utilized in canning various kinds of foods and includes a surrounding wall member 86 which is uniform in diameter throughout its height. The top of the can is secured to the wall member by the usual connecting construction 88. When the can is opened, the top is cut away and a small portion 90 remains, which previously constituted a portion of the top. This portion 90, after the cutting-away operation, is of generally cylindrical form and fitted flat to the inner surface of the wall member 86, while the portion of the top remaining on the outer surface of the can is of a beaded nature and readily adaptable to a snap-on cap such as cap 77. The inner diameter of this element 90 is only very slightly less than that of the wall member, being reduced only by double the thickness of the metal forming that element, and for all practical purposes insofar as the present invention is concerned, the element 90 does not reduce the effective inner diameter of the can. Consequently, the stem 92 and sealing means may be varied in construction slightly from the same elements of FIGURE 1, in that a single sealing washer 94 is provided instead of two washers. This sealing washer 94 is also highly flexible and is made of pure gum rubber or other suitable material possessing the desired high degree of flexibility and elasticity. The flanges 96 in this case are spaced apart a distance only necessary to provide space therebetween to receive the single washer 94 rather than the two washers in the previously described embodiments. In the present instance, the lower extremity 93 of the stem (92) is preferably straight, and the wall of the stem may be relatively thin, e.g., on the order of $1/16$ inch in thickness.

Inasmuch as it may be desired to limit the amount of food to be fed to a baby to a certain predetermined amount, a device for effecting this result is illustrated in FIGURES 7 and 8 and includes a clip 98 which is releasably disposed in selected pairs of a plurality of holes 100 in the stem 30. This clip 98, as shown in plan in FIGURE 8, includes longitudinal side arms 102 interconnected by a transverse piece 104 from which extend finger grip elements 106 rearwardly from the arms 102. On the free ends of the arms 102 are projections 108 which are insertable in the holes 100, these holes being arranged in pairs, those of a pair being diametrically aligned. This clip 98 may be of a desired material having a limited amount of flexibility, such as any of various known plastic materials, and is prestressed to the position shown in FIGURE 8, with the free ends of the arms 102 biased inwardly toward each other. In gripping the elements 106, as by the thumb and forefinger and pressing inwardly on them, the free ends of the arms 102 are swung outwardly away from each other to withdraw the projections 108 from the holes 100, which releases the clip from the holes. The clip is applied to the stem in a reverse series of those steps. When the clip is applied to the stem, it is in position to engage the cap 64 and does engage it when the stem lowers into the jar. The securement of the clip to the stem is sufficiently solid to prevent further movement of the stem into the jar after engagement of the clip with the cap as stated. These holes 100 are accompanied by markings 110 indicating quantities of food such as 1 oz., 2 oz., etc. If it should be desired to feed the baby, for example, 3 oz., of food, the clip will be applied to the 3 oz., holes 100 and upon depletion of the food from the jar in the feeding operation to the extent of 3 oz., the clip will engage the cap 64 and prevent further feeding.

The clip 98 has a further and very practical advantage in that it may be applied to the device at such a position to prevent any movement at all of the stem into the device, such as may be desired when the feeder is applied to a full or partially full jar and the assembly in that position placed in a carrying case, the clip then preventing accidental contraction of the stem or telescoping movement such as would expel some of the food into the carrying case. The projections 108 and holes 100 may be circular in cross section as illustrated, the projections being very slightly tapered to facilitate entry into the holes, and the holes being preferably cylindrical in shape. The slight taper thus provided is not sufficient to enable camming effect of the projections out of the holes by forces encountered when the clip engages the cap 64.

It will be observed that all portions of the device are easily cleaned, the sealing washers 40 and 42 being removable from the stem, as are the nipple 56 and cap 64 (or 77). All of the elements are individually integral, and they are easily and readily separated from one another, so that when the elements are removed from the stem as just referred to, each of those making up the baby food feeder can be easily cleaned.

A very important advantage is that the rate of feeding is completely controlled by the baby. Other advantages include great convenience and time saving, with no need to put the food into a special container.

FIGURES 10 to 19 show in detail the construction of the different kinds of caps included in FIGURES 1, 2 and 6. As noted above, baby foods are sold in two main kinds of containers, namely, a glass jar and a can. The glass jars are divided into two main types, namely, a snap-on cover type and a screw thread type. The screw thread type is of two different kinds, namely, continuous thread and interrupted thread, or "twist-on." The caps constituting the present phase of the present invention are of two kinds which together accommodate all of the four different kinds of baby food containers. The snap-on cap shown in FIGURES 9, 10 and 11 is adapted to the can type of container and the snap-on jar type; the second kind shown in FIGURES 12 to 19 is adapted to each of the two screw thread types of jar, namely, the continuous thread and the interrupted thread. The main purpose of the cap is to guide the stem 30 in its movements relative to the container in the feeding movements, but also it prevents entrance of foreign matter into the container.

Reference is first made to the cap 77 of FIGURES 9, 10, and 11 which is also shown in FIGURES 2 and 6, the latter illustrations showing the cap in two different sizes. This cap is preferably of thermoplastic material, and molded according to known methods. The central hole 112 receiving the stem 30 has a dimension in axial direction sufficient to provide the desired guiding function without any binding action. The flanges 118 and 114 extend downwardly from a flat annular portion 116 an extent in axial direction on the order of $7/16$ inch, from which it will be seen that the stem is guided effectively without any binding action. The fit between the stem and the flange 114 is preferably such as to produce slight friction but to enable relatively free sliding movement. However, air is permitted to enter therepast into the container. The central hole in the cap maintains the stem in accurate central alignment at all positions of the stem relative to its telescoping action with the container. The outer flange 118 is provided with a tab 120 extending in radial direction for gripping by the user and removing the cap from the container. The lower edge of the outer flange 118 is provided with an inner rib 122 extending preferably entirely therearound for releasably retaining the cap on the container as indicated in FIGURES 2 and 6.

The material from which the cap is formed, preferably a plastic material, is somewhat yieldable and resilient. In placing the cap onto the container, such as the jar 74 of FIGURE 2 or the can 84 of FIGURE 6, it is snapped over the circumferential bead on the respective container, which is shown at 76 in FIGURE 2 and at 88 in FIGURE 6. In either case, to apply the cap it is merely snapped over the bead, this being done after the inner end of the stem has been inserted into the container. The cap is so designed relative to the particular container in which it is intended to be used, that the inner diameter of the rib 122 is slightly smaller than the outer diameter of the external bead on the container.

To remove the cap from the container, the user grips the tab 120 and pulls it, releasing the portion of the rib 122 in that immediate area from engagement with the bead on the container, and the cap is then free to be lifted off, which may be done either by continuing lifting on the tab or applying the fingers to the lower edge of the cap.

Making reference now to the second type cap, the cap of FIGURES 12 to 19, as noted above, is for use with the screw thread type of container, having either continuous thread or interrupted thread. This cap, designated 64, and being the cap shown in FIGURE 1, has an annular flat portion 124 in which is formed a central aperture 126 defined by a surrounding flange 128, and having an outer depending flange 130. The cap 64 differs from the previous cap 77 in the elimination of the rib 122, and the inclusion of "spot threads" indicated at 132 and 134. These spot threads are quite short, and may be for example of 25 degrees in length, but it will be understood that the length of them may vary within a wide range. These spot threads are disposed at an angle similar to a commonly utilized inclination of thread elements on a jar type container. I have found that an angle in the neighborhood of 3 degrees produces excellent results in the screw threading operation of placing the cap on the jar and in retaining it thereon.

These spot threads 132 and 134 are disposed diametrically opposite each other but they are positioned at different heights relative to the lower edge of the cap, following the general inclination of the screw threads of the jar type of container here concerned. The cap illustrated in these figures for example may be on the order of 2 inches in diameter, and the spot thread 134 (see FIGURE 17) may be spaced approximately 2 mm. from the lower edge of the flange 130. The opposite spot thread 132 (see particularly FIGURE 16) may be positioned substantially flush with the lower edge of the flange 130, without space therebetween. In both cases, i.e., the spot threads 132 and 134, the space referred to is relative to the lower end of the thread.

An important advantage of the present cap is that a single construction of the cap is readily adaptable to the continuous thread type of jar or the interrupted thread or "twist-on" type. The continuous thread type is shown in FIGURE 18 where axially spaced thread portions on the near side are indicated at 138 and 140. These two thread portions are interconnected by another thread portion 142 shown in dotted lines and disposed on the far side of the jar, the thread portion 142 being disposed approximately midway in height between the thread portions 138 and 140, on any diameter.

The cap 64 when applied to the continuous thread type jar, as illustrated in FIGURE 18, is screwed onto the cap in the usual way, and the lower spot thread 132 engages under the adjacent portion of the screw thread, and in response to turning the cap, it rides down in engagement with the undersurface of the screw thread, and in response to the proper amount of rotational movement, the second spot thread engages under the thread element of the jar and follows therealong in the same manner. The difference in height between the spot threads is the same as or closely similar to the average spacing between successive thread portions on opposite sides of the jar.

FIGURE 19 shows the same cap 64 applied to a jar 144 having an interrupted thread. The kind of interrupted thread here concerned is customarily composed of three different and separate elements indicated at 146, 148 and 150. Adjacent thread elements overlap a slight amount, as shown in FIGURE 19 where the thread elements 146 and 148 are shown on the near side of the jar with the spot thread 132 engaged under the thread element 146, while the opposite spot thread 134 is engaged under the thread element 150 on the far side, the thread element 150 extending between and overlapping the other two at its ends. The relative positions of the thread elements and the spot threads are clearly shown in FIGURE 19, the difference in height of the portions of the thread elements at diametrically opposite positions being the same as or closely similar to the spacing of the corresponding thread elements in the continuous thread jar. This spacing determines the spacing in height between the spot threads which, in the example given, is 2 mm. Thus the same thread construction formed by the spot threads 132 and 134 accommodates both types of threads customarily provided on baby food jars. The spot threads preferably are approximately V-shaped in cross-section, as shown best in FIGURE 15, providing sloping sides, particularly the upper side, for effective engagement with the underside of the thread elements on the jar which customarily are curved, as viewed in cross section.

While I have shown herein certain preferred forms of the invention, it will be understood that certain changes may be made therein within the scope of the appended claims.

I claim:

1. A baby food feeder for use with a standard container of a predetermined inner diameter and having an open top and containing a quantity of semi-solid food capable of flowing action under slight pressure, comprising a hollow stem, a nipple having a relatively large aperture detachably connected on an outer end of the stem, a flexible disc secured on the inner end of the stem and dimensioned for sealingly engaging the inner surface of the container, a cap having a central hole receiving said stem and adapted to be detachably secured to and closing the open top of the container, said stem being substantially of uniform outer diameter between the disc and nipple and being capable of being drawn through the cap when the nipple is removed, the stem, carrying the nipple and disc, being capable of free rotating and sliding movement relative to the cap, and relative to the container when the cap is secured thereto, the stem and nipple being the only portions exposed outwardly of the cap and container when the cap is secured to the container, the disc and the inner end of the stem being adapted to engage the top surface of the food in the container, and the disc having a central hole exposing the interior of the stem to the food for passage thereof from the container through the stem and nipple, the stem and disc being operable for following the top of the food pursuant to depletion of the food on flowing through the stem and nipple caused by sucking action on the nipple and consequent relatively greater atmospheric pressure on the feeder.

2. A baby food feeder for use with a standard container of a predetermined inner diameter and having an open top and containing a quantity of semi-solid food capable of flowing action under slight pressure, comprising a hollow stem, a nipple having a relatively large aperture detachably connected on an outer end of the stem, flexible disc sealing means secured on the inner end of the stem and including an upper and a lower washer of respectively a greater and lesser diameter whereby to enable the feeder to be used with a said container having a main wall portion and a relatively constricted neck portion of substantially equivalent diameters to the washers respectively, a cap having a central hole receiving said stem and adapted to be detachably secured to and closing the open top of the container, said stem being substantially of uniform outer diameter between the disc sealing means and nipple and being capable of being drawn through the cap when the nipple is removed, the stem, carrying the nipple and disc sealing means, being capable of free rotating and sliding movement relative to the cap, and relative to the container when the cap is secured thereto, the stem and nipple being the only portions exposed outwardly of the cap and container when the cap is secured to the container, the disc sealing means and the inner end of the stem being adapted to engage the top surface of the food in the container, and the disc sealing means having a central hole exposing interior of the stem to the food for passage thereof from the container through the stem and nipple, the stem and disc sealing means being operable for following the top of the food pursuant to depletion of the food on flowing through the stem and nipple caused by sucking action on the nipple and consequent relatively greater atmospheric pressure on the feeder.

3. The invention set out in claim 2 in which the larger diameter washer is pre-formed to saucer shape having an outer peripheral portion disposed at an acute angle to the axis of the washer.

4. The invention set out in claim 3 in which the stem has at its inner end a pair of axially spaced, separate external flanges, and the disc sealing means is confined in the space between the flanges and thereby detachably secured on the stem, the flexible disc sealing means being capable of being flexed over the flanges for placing it on and removing it from the stem.

5. A baby food feeder for use with a standard container of a predetermined inner diameter and having an open top and containing a quantity of semi-solid food capable of flowing action under slight pressure, comprising a hollow stem, a nipple having a relatively large aperture detachably connected on an outer end of the stem, a flexible disc secured on the inner end of the stem and dimensioned for sealingly engaging the inner surface of the container, a cap having a central hole receiving said stem and adapted to be detachably secured to and closing the open top of the container, said stem being substantially of uniform outer diameter between the disc and nipple and being capable of being drawn through the cap when the nipple is removed, the stem, carrying the nipple and disc, being capable of free rotating and sliding movement relative to the cap, and relative to the container when the cap is secured thereto, the stem and nipple being the only portions exposed outwardly of the cap and container when the cap is secured to the container, the disc and the inner end of the stem being adapted to engage the top surface of the food in the container, and the disc having a central hole exposing the interior of the stem to the food for passage thereof from the container through the stem and nipple, the stem and disc being operable for following the top of the food pursuant to depletion of the food on flowing through the stem and nipple caused by sucking action on the nipple and consequent relatively greater atmospheric pressure on the feeder, the stem on its inner end surface having an undulating shape positioned for engaging the bottom element of the container with which the feeder is used as the food in the container nears depletion, whereby to enable the last remnants of the food under the disc to enter into and pass through the stem and nipple notwithstanding the fact that the inner end of the stem engages the bottom element in an area surrounding the internal central axis of the stem.

6. A baby food feeder for use with a standard container of a predetermined inner diameter and having an open top and containing a quantity of semi-solid food capable of flowing action under slight pressure, comprising a hollow stem, a nipple having a relatively large aperture detachably connected on an outer end of the stem, a flexible disc secured on the inner end of the stem and dimensioned for sealingly engaging the inner surface of the container, a cap having a central hole receiving said stem and adapted to be detachably secured to and closing the open top of the container, said stem being substantially of uniform outer diameter between the disc and nipple and being capable of being drawn through the cap when the nipple is removed, the stem, carrying the nipple and disc, being capable of free rotating and sliding movement relative to the cap, and relative to the container when the cap is secured thereto, the stem and nipple being the only portions exposed outwardly of the cap and container when the cap is secured to the container, the disc and the inner end of the stem being adapted to engage the top surface of the food in the container, and the disc having a central hole exposing the interior of the stem to the food for passage thereof from the container through the stem and nipple, the stem and disc being operable for following the top of the food pursuant to depletion of the food on flowing through the stem and nipple caused by sucking action on the nipple and consequent relatively greater atmospheric pressure on the feeder, the stem having a circumferential groove in its outer surface adjacent to but spaced from its outer end, and the nipple has an open base end with a circumferential bead on its inner surface, and the nipple is removably fitted on the outer end of the stem with the bead of the nipple removably fitted in the groove.

7. A baby food feeder for use with a standard container of a predetermined inner diameter and having an open top and containing a quantity of semi-solid food capable of flowing action under slight pressure, comprising a hollow stem, a nipple having a relatively large aperture detachably connected on an outer end of the stem, a flexible disc secured on the inner end of the stem and dimensioned for sealingly engaging the inner surface of the container, a cap having a central hole receiving said stem and adapted to be detachably secured to and closing the open top of the container, said stem being substantially of uniform outer diameter between the disc and nipple and being capable of being drawn through the cap when the nipple is removed, the stem, carrying the nipple and disc, being capable of free rotating and sliding movement relative to the cap, and relative to the container when the cap is secured thereto, the stem and nipple being the only portions exposed outwardly of the cap and container when the cap is secured to the container, the disc and the inner end of the stem being adapted to engage the top surface of the food in the container, and the disc having a central hole exposing the interior of the stem to the food for passage thereof from the container through the stem and nipple, the stem and disc being operable for following the top of the food pursuant to depletion of the food on flowing through the stem and nipple caused by sucking action on the nipple and consequent relatively greater atmospheric pressure on the feeder, the stem having a plurality of pairs of holes in its outer surface spaced longitudinally thereof, with those of each pair diametrically aligned, the feeder also including a clip having projections arranged for insertion in the holes of any selected pair for securing the clip to the stem at any position represented by the selected hole, the clip being engageable with the cap in response to movement of the stem into the container thereby limiting such movement of the stem.

8. The invention set out in claim 7 in which the clip is a flexible member having lateral arms interconnected at one end by a transverse piece and the projections are located on the free ends of the arms, and finger grip pieces are provided on the transverse piece and extend oppositely from said arms, and in which movement of the finger grip pieces together as by squeezing them between the fingers separates the free ends of the arms and removes the projections from the holes.

9. A baby food feeder for use with a standard container of a predetermined inner diameter and having an open top and containing a quantity of semi-solid food capable of flowing action under slight pressure, comprising a hollow stem, having a bore on the order of ½" in diameter, a nipple having an aperture on the order of ⅛" to ³⁄₁₆" in diameter, detachably connected on an outer end of the stem, a flexible disc secured on the inner end of the stem and dimensioned for sealingly engaging the inner surface of the container, a cap having a central hole receiving said stem and adapted to be detachably secured to and closing the open top of the container, said stem being substantially of uniform outer diameter between the disc and nipple and being capable of being drawn through the cap when the nipple is removed, the stem, carrying the nipple and disc, being capable of free rotating and sliding movement relative to the cap, and relative to the container when the cap is secured thereto, the stem and nipple being the only portions exposed outwardly of the cap and container when the cap is secured to the container, the disc and the inner end of the stem being adapted to engage the top surface of the food in the container, and the disc having a central hole exposing the interior of the stem to the food for passage thereof from the container through the stem and nipple, the stem and disc being operable for following the top of the food pursuant to depletion of the food on flowing through the stem and nipple caused by sucking action on the nipple and consequent relatively greater atmospheric pressure on the feeder.

References Cited in the file of this patent

UNITED STATES PATENTS

| | | |
|---|---|---|
| 593,830 | Borgenschild | Nov. 16, 1897 |
| 950,710 | Williams | Mar. 1, 1910 |
| 2,158,318 | Bernhardt | May 16, 1939 |
| 2,231,412 | McCarthy | Feb. 11, 1941 |
| 2,269,371 | Hammerschmidt et al. | Jan. 6, 1942 |
| 2,341,031 | Flynn | Feb. 8, 1944 |
| 2,550,210 | Vance | Apr. 24, 1951 |
| 2,599,071 | Schwarz | June 3, 1952 |
| 2,889,964 | Cooprider | June 9, 1959 |
| 2,915,225 | Atkins | Dec. 1, 1959 |